US011604326B2

(12) United States Patent
Sun et al.

(10) Patent No.: US 11,604,326 B2
(45) Date of Patent: Mar. 14, 2023

(54) DRIVING DEVICE, CAMERA MODULE, ELECTRONIC APPARATUS, AND METHOD FOR MANUFACTURING DRIVING DEVICE

(71) Applicant: New Shicoh Motor Co., LTD, Zhejiang (CN)

(72) Inventors: Wei Sun, Zhejiang (CN); Juhe Zhou, Zhejiang (CN)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 435 days.

(21) Appl. No.: 16/819,579

(22) Filed: Mar. 16, 2020

(65) Prior Publication Data

US 2020/0301095 A1 Sep. 24, 2020

(30) Foreign Application Priority Data

Mar. 19, 2019 (CN) .......................... 201910207782.9

(51) Int. Cl.
*G02B 7/04* (2021.01)
*H02K 41/035* (2006.01)
*G03B 13/34* (2021.01)

(52) U.S. Cl.
CPC ............... *G02B 7/04* (2013.01); *G03B 13/34* (2013.01); *H02K 41/0356* (2013.01)

(58) Field of Classification Search
CPC . G02B 7/04; G02B 7/08; G03B 13/34; G03B 2205/0046; G03B 2205/0069; G03B 3/10; G03B 30/00; G03B 5/00; H02K 41/0356
See application file for complete search history.

(56) References Cited

U.S. PATENT DOCUMENTS

| 2012/0154614 | A1* | 6/2012 | Moriya | H04N 5/2254 |
| | | | | 348/208.5 |
| 2012/0229926 | A1* | 9/2012 | Wade | G02B 7/04 |
| | | | | 359/823 |
| 2015/0168668 | A1* | 6/2015 | Wu | G03B 13/36 |
| | | | | 359/557 |
| 2018/0321460 | A1* | 11/2018 | Lee | G03B 17/08 |

FOREIGN PATENT DOCUMENTS

| JP | 2011118032 | A | 6/2011 |
| JP | 2012177755 | A | 9/2012 |
| JP | 2013228610 | A | 11/2013 |
| JP | 5996672 | B2 | 9/2016 |
| KR | 20150142196 | A | 12/2015 |
| KR | 20180008848 | A | 1/2018 |

* cited by examiner

*Primary Examiner* — Joseph P Martinez
*Assistant Examiner* — Vipin Patel
(74) *Attorney, Agent, or Firm* — Hayes Soloway PC

(57) ABSTRACT

In an embodiment, a driving device includes a base, a lower spring, a lens unit, an upper spring, a coil, and a magnet. The base has a terminal. The lower spring is elastically provided between the base and the lens unit. The lens unit is movably provided on the base relative to the base. The upper spring is provided on the lens unit. The coil is provided on the lens unit. The magnet is arranged corresponding to the coil. One end of the terminal is exposed from a bottom portion of the base, and the other end extends toward the upper spring to be electrically connected to the upper spring. The upper spring is also electrically connected to the coil.

8 Claims, 4 Drawing Sheets

DRIVING DEVICE, CAMERA MODULE, ELECTRONIC APPARATUS, AND METHOD FOR MANUFACTURING DRIVING DEVICE

CROSS-REFERENCE TO RELATED APPLICATION

This application claims the benefit of Chinese patent application CN 201910207782.9 filed on Mar. 19, 2019, the contents of which are incorporated by reference herein.

TECHNICAL FIELD

The present disclosure relates to the field of imaging technique, and in particular to a driving device, a camera module, an electronic apparatus, and a method for manufacturing a driving device.

BACKGROUND

With the advances in science and technology, camera modules have been more and more widely used. At present, in addition to cameras, electronic apparatus such as mobile phones and computers have been equipped with camera module to facilitate people to take pictures anytime and anywhere, which brings convenience and fun to people's lives. The camera modules include fixed focus camera modules and zoom camera modules. In a zoom camera module, the lens can be driven to move by a driving device to achieve focus.

The driving device generally includes a base, a lower spring, a carrier, an upper spring, a magnet, a coil, and a housing. The lower spring is disposed on the base. The carrier is disposed on the base and is located between the upper spring and the lower spring. The coil is electrically connected to the circuit board under the driving device through the lower spring to achieve electrical conduction. When the coil is energized, the coil generates a force that drives the carrier to move up and down under the magnetic force of the magnet, thereby driving the lens mounted on the carrier to move up and down to achieve focus. When the driving device is assembled, the lower spring, the carrier and the coil are generally assembled into a mover portion. And then, the mover portion is assembled to the base. Finally, the assembled portion as a whole is connected to the housing that is provided with a magnet and an upper spring.

However, in the above driving device, since the lower spring is electrically connected to the circuit board and the lower spring is electrically connected to the base after being assembled with the carrier and the coil, the operation space is small and the operation is inconvenient during connection.

The foregoing description is intended to provide general background information and does not necessarily constitute prior art.

SUMMARY

An object of the present disclosure is to provide a driving device, a camera module, an electronic apparatus and a method for manufacturing a driving device, which have a larger operation space for assembling and are convenient to operate.

In accordance with a first aspect of the present disclosure, there is provided a driving device including a base, a lower spring, a lens unit, an upper spring, a coil, and a magnet. The base includes a terminal. The lower spring is elastically disposed between the base and the lens unit. The lens unit is movably disposed on the base relative to the base. The upper spring is disposed on the lens unit. The coil is disposed on the lens unit, and the magnet is arranged corresponding to the coil. One end of the terminal is exposed from the bottom portion of the base, and the other end extends toward the upper spring to be electrically connected to the upper spring. The upper spring is also electrically connected to the coil.

In accordance with a second aspect of the present disclosure, there is provided a driving device including a base with two terminals, a lens unit, an upper spring supporting the lens unit from an upper side, and a coil disposed on the lens unit. The base has at least two corner columns erected at a corner portion thereof. The two terminals have one end exposed from a bottom portion of the base and other end exposed from an upper surface of the corner column. The upper spring includes an inner portion, an outer portion, and a connection deforming portion connecting the inner portion and the outer portion, and is divided into at least two upper spring portion. Each of the outer portions of the upper spring portions is connected to the base at the upper surface and electrically connected to the terminal, and the each of the inner portions is connected to the lens unit and electrically connected to the end portion of the coil.

In accordance with a third aspect of the present disclosure, there is provided a camera module including the driving device described above.

In accordance with a fourth aspect of the present disclosure, there is provided an electronic apparatus including the camera module described above.

In accordance with a fifth aspect of the present disclosure, there is provided a method for manufacturing a driving device. The method includes steps of:

providing a base, wherein the base includes a terminal;

providing a lower spring, disposing the lower spring on the base, and fixing one end of the lower spring to the base;

providing a lens unit and a coil, disposing the coil on the lens unit, disposing the lens unit on the base, and connecting the other end of the lower spring to the lens unit;

providing an upper spring and disposing the upper spring on the lens unit, wherein the upper spring is respectively electrically connected to the terminal and the coil; and providing a magnet and a housing, disposing the magnet in the housing, and covering the housing above the lens unit so that the upper spring is located between the lens unit and the housing and the magnet is arranged corresponding to the coil.

DETAILED DESCRIPTION

The specific embodiments of the present disclosure are described in further detail below with reference to the drawings and Examples. The following Examples are used to illustrate the present disclosure, but not to limit the scope of the present disclosure.

Figure 1:
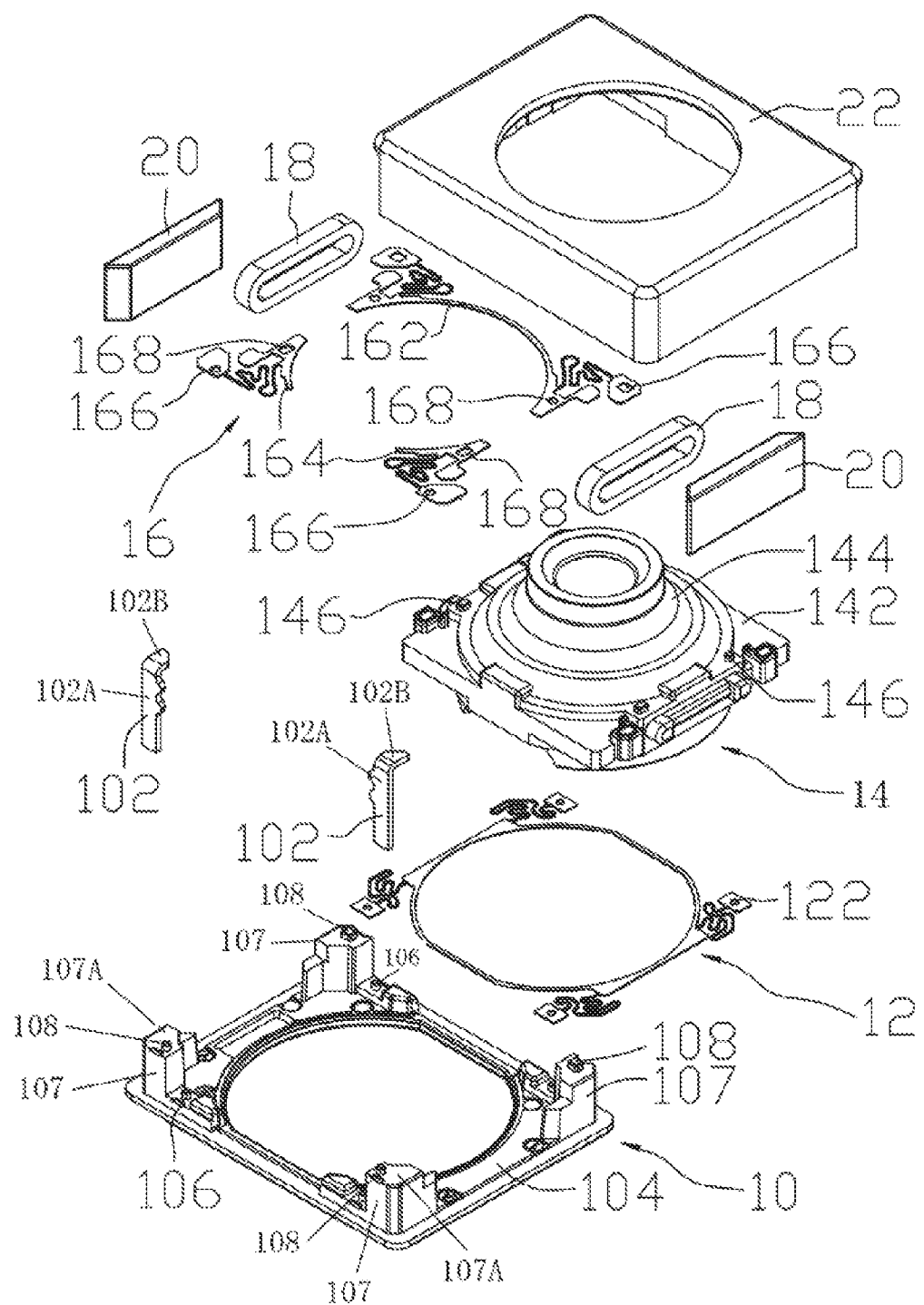
FIG. 1 is a schematic exploded perspective view of a driving device according to an Example of the present disclosure.
Figure 2:
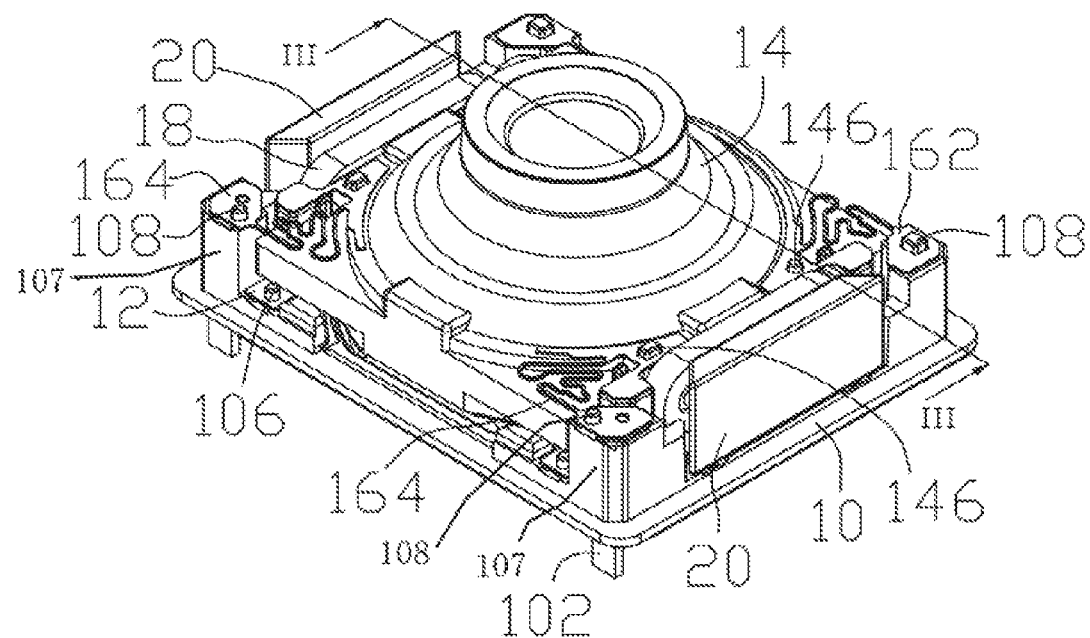
FIG. 2 is an assembly drawing of the driving device shown in FIG. 1 with the housing removed.
Figure 3:
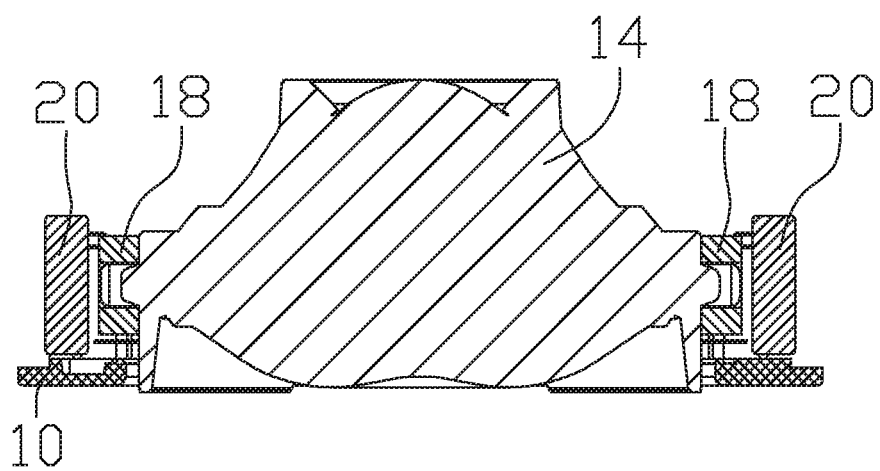
FIG. 3 is a cross-sectional view taken along line III-III of FIG. 2.

Referring to FIG. 1 to FIG. 3, the driving device provided in an Example of the present disclosure includes a base 10, a lower spring 12, a lens unit 14, an upper spring 16, a coil 18, a magnet 20 and a housing 22. The base 10 includes a terminal 102. The lower spring 12 is elastically disposed between the base 10 and the lens unit 14. The lens unit 14 is movably disposed on the base 10 relative to the base 10. The upper spring 16 is disposed between the lens unit 14 and the housing 22. One end of the terminal 102 is exposed from the bottom portion of the base 10, and the other end extends toward the upper spring 16 to be electrically connected to the upper spring 16. The upper spring 16 is also electrically connected to the coil 18. The coil 18 is disposed on the lens unit 14. The magnet 20 is disposed on the housing 22, and the magnet 20 is arranged corresponding to the coil 18.

In this driving device, by electrically connecting the terminal 102 to the upper spring 16 electrically connected to the coil 18, the electrical connection through the upper spring 16 is realized. In addition, the connection process between the terminal 102 and the upper spring 16 can be operated on the upper portion of the lens unit 14, in which the operation space is large and the operation is convenient. At the same time, since the operation is conducted on the upper portion of the lens unit 14, the lower spring 12, the lens unit 14 and the housing 22 can be sequentially arranged above the base 10, and all the components do not need to be flipped over, the operation is more convenient and the assembly process is more simplified. In addition, since the operation is conducted on the upper portion of the lens unit 14, when the upper spring 16 and the terminal 102 are welded together, a protective film can be added to prevent the lens unit 14 from being contaminated during welding.

In this embodiment, the base 10 further includes a basal portion 104, and the terminal 102 is embedded in the base 10. The base 10 may be formed by plastic injection molding. The terminal 102 is made of a conductive material, such as a metal, and is formed integrally when the base 10 is molded. The terminal 102 has a vertical portion 102A extending vertically and a horizontal portion 102B extending horizontally. In this embodiment, there are two terminals 102 separated from each other. The basal portion 104 of the base 10 is provided with a first convex column 106. Each of the four corner portions of the base 10 is further provided with a corner column 107, and the upper surface 107A of the corner column 107 is provided with a second convex column 108. The lower end of the vertical portion 102A of the terminal 102 is exposed from the bottom portion of the base 10, and the vertical portion 102A extends upward inside of corner column 107, and the horizontal portion 102B is exposed on the upper surface 107A. The terminal 102 is located outside the outer edge of the lens unit 14.

In this embodiment, the lower spring 12 is an integral structure, one end of which is fixedly connected to the base 10 and the other end is fixedly connected to the lens unit 14. The lower spring 12 can support the lens unit 14 and also allow the lens unit 14 to move with respect to the base 10. Specifically, the lower spring 12 includes a first inner portion, a first connection deformation portion and a first outer portion. The connection deformation portion is deformable and connects the first inner portion and the first outer portion. The first outer portion is fixedly connected to the base 10 and the first inner portion is fixedly connected to the lens unit 14. More specifically, the lower spring 12 is provided with a first engaging hole 122, and the first convex column 106 of the base 10 is engaged into the first engaging hole 122.

In this embodiment, the lens unit 14 includes a carrier 142 and a lens 144 fixed on the carrier 142. Specifically, in this embodiment, the carrier 142 and the lens 144 are configured as an integrated structure. It can be understood that the carrier 142 and the lens 144 may also be separate structures and they are assembled together during assembly. When the carrier 142 and the lens 144 are integrally configured, the assembly process can be simplified during assembly. In particular, the upper portion of the carrier 142 is provided with a third convex column 146.

In this embodiment, one end of the upper spring 16 is fixedly connected to the base 10 and the other end is fixedly connected to the lens unit 14 to allow the lens unit 14 to move with respect to the base 10. Specifically, the upper spring 16 includes one first upper spring portion 162 and two second upper spring portions 164. One ends of the first upper spring portion 162 and the second upper spring portions 164 are all fixedly connected to the base 10, and the other ends are all fixedly connected to the lens unit 14 to allow the lens unit 14 to move with respect to the base 10. The second outer portions described later of the two second upper spring portions 164 are respectively electrically connected to the two terminal 102 respectively exposed on the upper surfaces 107A of the two corner columns 107.

Specifically, the upper spring 16 includes a second inner portion, a second connection deformation portion and a second outer portion. The second connection deformation portion is deformable and connects the second inner portion and the second outer portion. The second outer portion is fixedly connected to the base 10 and the second inner portion is fixedly connected to the lens unit 14. More specifically, the second outer portion of the upper spring 16 is provided with a second engaging hole 166, and the second inner portion is provided with a third engaging hole 168. The second convex column 108 formed on the upper surface 107A of the corner column 107 of the base 10 is engaged into the second engaging hole 166, and the third convex column 146 of the carrier 142 is engaged into the third engaging hole 168.

In this embodiment, the coil 18 is disposed on the carrier 142. In this Example, there are two coils 18. One ends of the two coils 18 are respectively electrically connected to second inner portions of the two second upper spring portions 164, and the other ends of the two coils 18 are respectively electrically connected to the second inner portions of the first upper spring portion 162. In this way, the two coils 18 are connected in series. The current flows in from one terminal 102, passes through one second upper spring portions 164, one coil 18, the first upper spring portion 162, the other coil 18, and the other second upper spring portion 164, successively, and finally flows out through the other terminal 102. It can be understood that the number of the coil 18 may be one. In this case, the upper spring 16 may be only divided into two parts correspondingly, and the two parts of the upper spring 16 are electrically connected to both ends of the coils 18, respectively. In addition, three or more coils 18 may be provided as necessary, by adjusting the connection relationship of the circuit correspondingly.

Specifically, the two coils 18 are respectively disposed on two opposite sides of the lens unit 14. In this way, the other two sides of the lens unit 14 are not provided with coils 18, which can reduce the external size of the other two sides of the driving device and is beneficial to the miniaturization of the driving device.

In this embodiment, corresponding to the number of the coils 18, the number of the magnets 20 is also two. The two magnets 20 are respectively disposed on two opposite inner surfaces of the housing 22, and are respectively opposed to the two coils 18. Similarly, the other two inner opposite surfaces of the housing 22 are not provided with the magnets 20, which can reduce the external size of the other two sides of the driving device and is beneficial to the miniaturization of the driving device.

In this embodiment, the housing 22 is covered on the base 10, so that the lower spring 12, the lens unit 14, the upper spring 16, the coil 18 and the magnet 20 are all accommodated in the housing 22. Specifically, the housing 22 can be fixedly connected to the base 10. The terminal 102 is located between the lens unit 14 and the housing 22 and is electrically connected to the upper spring 16.

The present disclosure further provides a camera module including the driving device described above. The camera module further includes an image sensor below the base 10 and can receive light passing through the lens 144.

The present disclosure further provides an electronic apparatus including the camera module described above, for example, a smartphone or the like.

Figure 5:
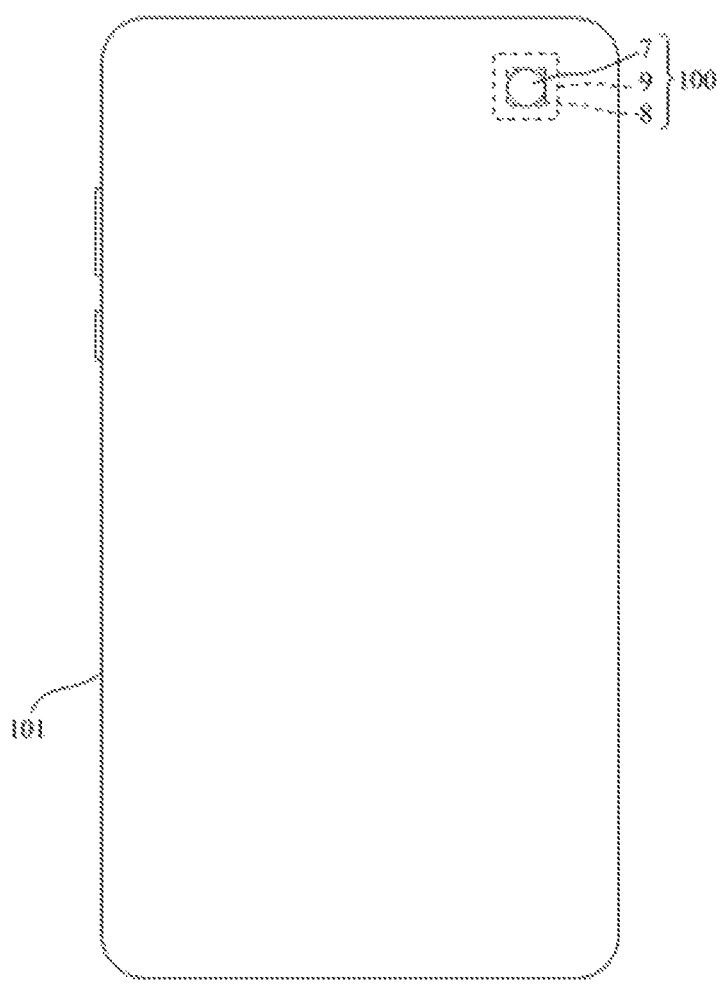
FIG. 5 is a front view of a smartphone mounted with a camera device including a driving device according to an embodiment of the present disclosure.

FIG. 5 shows an embodiment of an electronic apparatus including the camera module described above. The camera device 100 shown in FIG. 5 includes the camera module 9 according to the first embodiment of the present disclosure, and is embedded in the case body so that the lens body 7 is exposed from an opening in the rear surface of the case body of the smartphone 101. The camera device 100 includes: a lens unit; an image sensor 8 converting light incident through the lens 144 in the lens body 144 into an image signal; and an driving device 9 described above.

Figure 4:
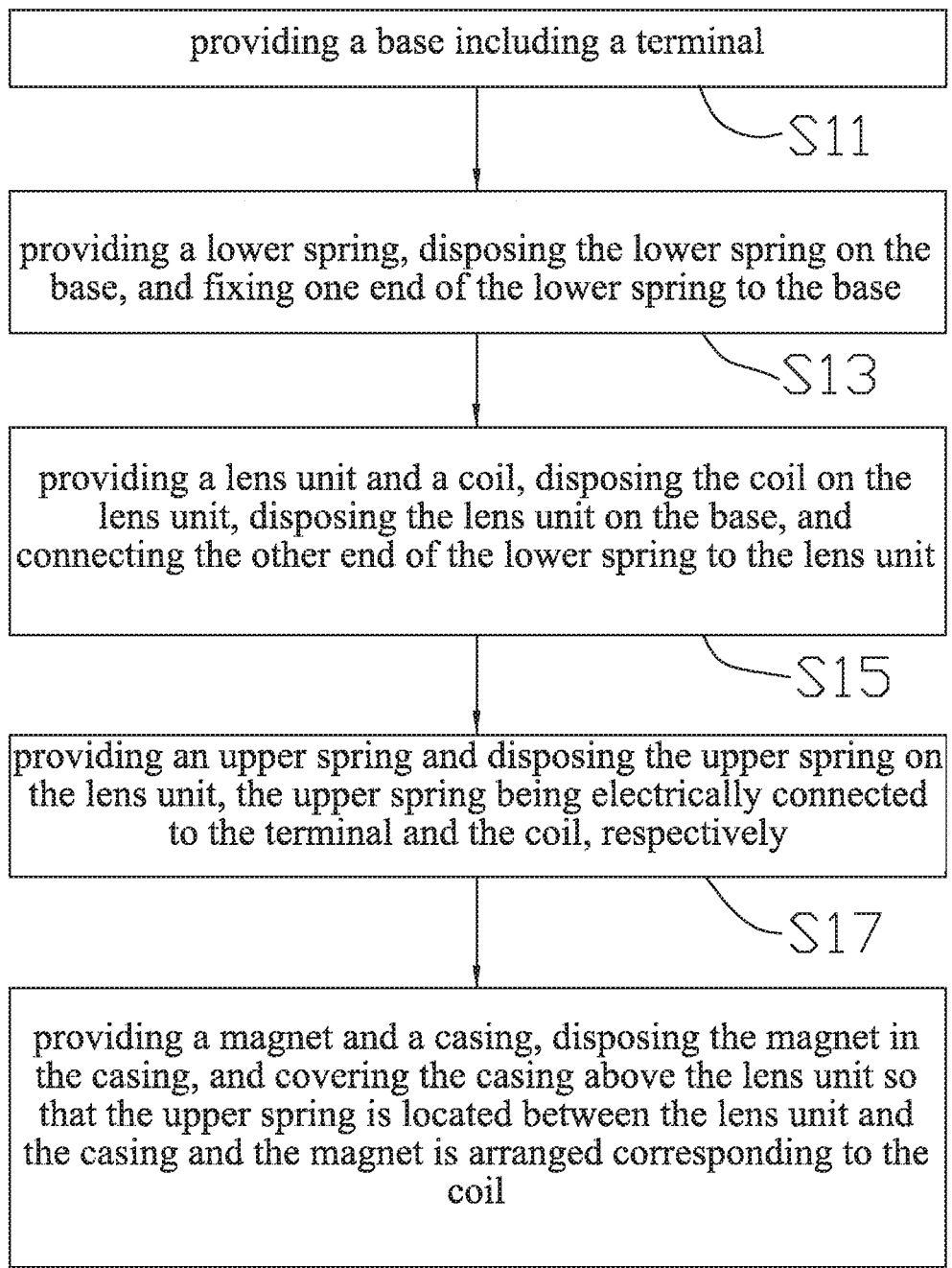
FIG. 4 is a flowchart of a method for manufacturing the driving device according to an Example of the present disclosure.

The present disclosure further provides a method for manufacturing a driving device. Referring to FIG. 4, the method for manufacturing a driving device according to an embodiment of the present disclosure includes the following steps.

S11: a base 10 is provided. The base 10 includes a terminal 102.

Specifically, the base 10 further includes a basal portion 104, and the terminal 102 is embedded in the base 10. The base 10 may be formed by plastic injection molding. The terminal 102 is made of a conductive material, such as a metal, and is formed integrally when the base 10 is molded. The terminal 102 has a vertical portion 102A extending vertically and a horizontal portion 102B extending horizontally. In this embodiment, there are two terminals 102 separated from each other. The basal portion 104 of the base 10 is provided with a first convex column 106. Each of the four corner portions of the base 10 is further provided with a corner column 107, and the upper surface 107A of the corner column 107 is provided with a second convex column 108. The lower end of the vertical portion 102A of the terminal 102 is exposed from the bottom portion of the base 10, and the vertical portion 102A extends upward inside of corner column 107, and the horizontal portion 102B is exposed on the upper surface 107A.

S13: a lower spring 12 is provided, the lower spring 12 is disposed on the base 10, and one end of the lower spring 12 is fixed to base 10. Specifically, the lower spring 12 is an integral structure, one end of which is fixedly connected to the base 10 and the other end is fixedly connected to the lens unit 14. The lower spring 12 can support the lens unit 14 and also allow the lens unit 14 to move with respect to the base 10. Specifically, the lower spring 12 includes a first inner portion, a first connection deformation portion and a first outer portion. The first connection deformation portion is deformable and connects the first inner portion and the first outer portion. The first outer portion is fixedly connected to the base 10 and the first inner portion is fixedly connected to the lens unit 14. More specifically, the lower spring 12 is provided with a first engaging hole 122, and the first convex column 106 of the base 10 is engageably inserted into the first engaging hole 122.

S15: a lens unit 14 and a coil 18 are provided, the coil 18 is disposed on the lens unit 14, the lens unit 14 is disposed on the base 10, and the other end of the lower spring 12 is connected to the lens unit 14. Specifically, the coil 18 may be assembled on the lens unit 14 first, and then the lens unit 14 may be disposed on the base 10; or the lens unit 14 may be disposed on the base 10, and then the coil 18 may be assembled on the lens unit 14.

In particular, the lens unit 14 includes a carrier 142 and a lens 144 fixed on the carrier 142. Specifically, in this embodiment, the carrier 142 and the lens 144 are configured as an integrated structure. It can be understood that the carrier 142 and the lens 144 may also be separate structures, and they are assembled together during assembly. When the carrier 142 and the lens 144 adopt an integrated structure, the assembly process can be simplified during assembly. In particular, the upper portion of the carrier 142 is provided with a third convex column 146. The coil 18 is disposed on the carrier 142. In this embodiment, there are two coils 18. More specifically, the two coils 18 are respectively disposed on two opposite sides of the lens unit 14. In this way, the other two sides of the lens unit 14 are not provided with coils 18, which can reduce the external size of the other two sides of the driving device and is beneficial to the miniaturization of the driving device. Of course, there may be three or more coils 18.

S17: an upper spring 16 is provided, and the upper spring 16 is disposed on the lens unit 14, wherein the upper spring 16 is respectively electrically connected to the terminal 102 and the coil 18.

Specifically, one end of the spring 16 is fixedly connected to the base 10 and the other end is fixedly connected to the lens unit 14 to allow the lens unit 14 to move with respect to the base 10. Specifically, the upper spring 16 includes one first upper spring portion 162 and two second upper spring portions 164. One ends of the first upper spring portion 162 and the second upper spring portions 164 are all fixedly connected to the base 10, and the other ends are all fixedly connected to the lens unit 14 to allow the lens unit 14 to move with respect to the base 10. The two second upper spring portions 164 are respectively electrically connected to the two terminals 102 respectively exposed on the upper surfaces 107A of the two corner columns 107.

More specifically, the upper spring 16 includes a second inner portion, a second connection deformation portion and a second outer portion. The second connection deformation portion is deformable and connects the second inner portion and the second outer portion. The second outer portion is fixedly connected to the base 10, and the second inner portion is fixedly connected to the lens unit 14. In addition, the second outer portion of the upper spring 16 is provided with a second engaging hole 166, and the second inner portion is provided with a third engaging hole 168, the second convex column 108 formed on the upper surface 107A of the corner column 107 of the base 10 is engageably inserted into the second engaging hole 166, and the third convex column 146 of the carrier 142 is engageably inserted into the third engaging hole 168.

In step S17, the steps of electrically connecting the upper spring 16 with the terminal 102 and the coil 18 are specifically as follows. The second outer portions of the two second upper spring portions 164 are electrically connected to the two terminals 102 respectively, specifically, may be welded together. One ends of the two coils 18 are respectively electrically connected to the second inner portions of the two second upper spring portions 164, and the other ends of the two coils 18 are respectively electrically connected to second inner portion of the first upper spring portion 162. In this way, the two coils 18 are connected in series. The current flows in from one terminal 102, then passes through one second upper spring portions 164, one coil 18, the first upper spring portion 162, the other coil 18, and the other second upper spring portion 164, successively, and finally flows out through the other terminal 102. When there is one coil 18, the upper spring 16 is only divided into two parts correspondingly, and the two parts of the upper spring 16 are electrically connected to both ends of the coils 18, respectively. When there are three or more coils 18, the connection relationship of the circuit may be adjusted correspondingly as required.

S19: a magnet 20 and a housing 22 are provided, the magnet 20 is disposed in the housing 22, and the housing 22 is covered from above the lens unit 14 so that the upper spring 16 is located between the lens unit 14 and the housing 22 and the magnet 20 is arranged corresponding to the coil 18.

Specifically, the housing 22 is covered above the base 10, so that the lower spring 12, the lens unit 14, the upper spring 16, the coil 18 and the magnet 20 are all accommodated in the housing 22. The housing 22 can be fixedly connected to the base 10. The terminal 102 is located between the lens unit 14 and the housing 22 and is electrically connected to the upper spring 16.

Using the method for manufacturing a driving device, by electrically connecting the terminal 102 to the upper spring 16 electrically connected to the coil 18, the electrical connection through the upper spring 16 is realized, the connection process between the terminal 102 and the upper spring 16 can be operated on the upper portion of the lens unit 14, in which the operation space is large and the operation is convenient. At the same time, since the operation is conducted on the upper portion of the lens unit 14, the lower spring 12, the lens unit 14 and the housing 22 can be sequentially arranged above the base 10, and all the components do not need to be flipped over, the operation is more convenient and the assembly process is more simplified. In addition, since the operation is conducted on the upper portion of the lens unit 14, when the upper spring 16 and the terminal 102 are welded together, a protective film can be added to prevent the lens unit 14 from being contaminated during welding.

In the drawings, the layers and the regions are drawn larger in size and relative size than the actual ones, respectively, which are intended to make the explanation clearer. It will be understood that when an element such as a layer, a region or a substrate is referred to as being "formed", "disposed", or "located" on another element, the element may be directly disposed on the another element, or an intermediate element may be present. In contrast, when an element is described as being "directly formed" or "directly disposed" on another element, there is no intermediate element present.

As used herein, the terms "install", "joint", and "connect" should be interpreted broadly unless otherwise specified and defined. For example, it may be a fixed connection, a detachable connection or an integral connection; it may be a mechanical connection or an electrical connection; it may be a direct connection or an indirect connection via an intermediate medium, and it may be an internal communication between two elements. For those of ordinary skill in the art, the specific meanings of the above terms may be understood on a case-by-case basis.

As used herein, the orientations or positional relationships indicated by the terms "up", "down", "front", "back", "left", "right", "top", "bottom", "inside", "outside", "vertical", or "horizontal" are based on the orientations or positional relationships shown in the attached drawings, and are only for the purpose of expressing the clarity and ease of description of the technical solution and therefore cannot be understood as a limitation on the present disclosure.

As used herein, the sequence adjectives "first", "second", etc. used to describe elements are only used to distinguish elements with similar properties, which does not mean that the elements described in this way must follow a given order, or time, space, grade or other limitations.

As used herein, unless otherwise stated, "multiple" and "several" mean two or more.

The technical features of the embodiments described above can be arbitrarily combined. In order to simplify the description, all possible combinations of the technical features in the above embodiments have not been described. However, as long as there is no contradiction in the combination of these technical features, it should be considered as the scope described in this specification.

As used herein, the terms "include", "comprise", or any other variation thereof are intended to encompass non-exclusive inclusions. In addition to those listed, other elements not expressly listed may also be included.

The above is only a specific implementation of the present disclosure, and the protection scope of the present disclosure is not limited thereto. Any person skilled in the art can easily think of changes or replacements within the technical scope disclosed by the present disclosure, which should be covered by the protection scope of the present disclosure. Therefore, the protection scope of the present disclosure shall be subject to the protection scope of the claims.

What is claimed is:

1. A driving device comprising a base, a housing covered on the base, a lower spring, a lens unit, an upper spring, two coils, and two magnets, wherein:
   the base comprises two terminals,
   the lower spring is elastically provided between the base and the lens unit,
   the lens unit is movably provided on the base relative to the base,
   the upper spring is provided on the lens unit,
   the two coils are provided on the lens unit,
   the two magnets are arranged corresponding to the two coils,
   one end of the terminal is exposed from a bottom portion of the base, and the other end extends toward the upper spring to be electrically connected to the upper spring, and
   the upper spring is also electrically connected to the coil, wherein
   the two coils are respectively disposed on two opposite sides of the lens unit, and the two magnets are disposed on two opposite inner surfaces of the housing and are respectively opposite to the two coils, wherein the upper spring comprises a first upper spring portion and two second upper spring portions, one ends of the first upper spring portion and the second upper spring portions are all fixedly connected to the base, and other ends are all fixedly connected to the lens unit, the two second upper spring portions are respectively electrically connected to the two terminals, one ends of the two coils are respectively electrically connected to the two second upper spring portions, and other ends of the two coils are respectively electrically connected to the first upper spring portion.

2. The driving device according to claim 1, wherein the lens unit comprises a carrier and a lens fixed on the carrier, and the carrier and the lens are configured as an integrated structure.

3. The driving device according to claim 2, wherein the base further comprises a basal portion, the terminal is embedded in the base, the base is provided with a first convex column and the base is further provided with a second convex column, the lower spring is provided with a first engaging hole, and the first convex column is engaged into the first engaging hole; the carrier is provided with a third convex column, the upper spring comprises a second inner portion, a second connection deformation portion and a second outer portion, the second connection deformation portion connects the second inner portion and the second outer portion, the second outer portion is provided with a second engaging hole, the second inner portion is provided with a third engaging hole, and the second convex column is engageably inserted into the second engaging hole, and the third convex column is engageably inserted into the third engaging hole.

4. The driving device according to claim 2, further comprising a housing, wherein:

the housing is covered above the base, the lower spring, the lens unit, the upper spring, the coil and the magnet are accommodated in the housing, and the terminal is located between the lens unit and the housing and electrically connected to the upper spring.

5. A camera module, comprising the driving device according to claim 1.

6. An electronic apparatus, comprising the camera module according to claim 5.

7. A driving device, comprising a base with two terminals, a lens unit, an upper spring supporting the lens unit from an upper side, and two coils provided on the lens unit, wherein:

the base comprises at least two corner columns erected at a corner portion thereof, and the two terminals have one end exposed from a bottom portion of the base and other end exposed from an upper surface of the corner column, the upper spring comprises a first upper spring portion and two second upper spring portions having an inner portion, an outer portion, and a connection deforming portion connecting the inner portion and the outer portion, respectively, and each of the outer portions of the two second upper spring portions are connected to the base at the upper surface and electrically connected to the terminal, and the each of the inner portions of the two second upper spring portions are connected to the lens unit and electrically connected to the end portion of the coil two coils, and each of the other end portions of the two coils is electrically connected to the inner portion of the first upper spring portion.

8. A method for manufacturing a driving device, comprising steps of:

providing a base, wherein the base comprises two terminals;

providing a lower spring, disposing the lower spring on the base and fixing one end of the lower spring to the base;

providing a lens unit and two coils, disposing the coil on the lens unit, disposing the lens unit on the base, and connecting other end of the lower spring to the lens unit;

providing an upper spring including a first upper spring portion and two second upper spring portions, wherein one end of the first upper spring portion and the second upper spring portions are all fixedly connected to the base, and other ends are all fixedly connected to the lens unit, and the two second upper spring portions are respectively electrically connected to the two terminals, and one ends of the two coils are respectively electrically connected to the two second upper spring portions, and other ends of the two coils are respectively electrically connected to the first upper spring portion, and providing two magnets and a housing, disposing the two magnets in the housing, and covering the housing above the lens unit so that the upper spring is located between the lens unit and the housing and the two magnets are arranged corresponding to the two coils.

* * * * *